United States Patent [19]
Cariffe

[11] Patent Number: 5,638,187
[45] Date of Patent: Jun. 10, 1997

[54] IMAGE DITHERING METHOD ENABLING CONVERSION OF A GRAY LEVEL PIXEL IMAGE INTO A BINARY PIXEL IMAGE

[75] Inventor: Alan E. Cariffe, San Diego, Calif.

[73] Assignee: Hewlett-Packard Company, Palo Alto, Calif.

[21] Appl. No.: 623,311

[22] Filed: Feb. 23, 1996

[51] Int. Cl.$^6$ .................................................. H04N 1/40
[52] U.S. Cl. ........................... 358/455; 358/456; 358/457
[58] Field of Search ............................... 358/455–458, 358/534–536, 429, 298

[56] References Cited

U.S. PATENT DOCUMENTS

| 4,914,524 | 4/1990 | Kimura | 358/457 |
| 4,937,677 | 6/1990 | Van Dorsselaer | 358/456 |
| 5,317,418 | 5/1994 | Lin | 358/456 |
| 5,526,438 | 6/1996 | Barton | 358/457 |

Primary Examiner—Stephen Brinich

[57] ABSTRACT

A method converts a multi-pixel gray level raster image to a multi-pixel binary raster image, with the gray level raster image including up to P gray level values. The method first arranges the P gray level values into an ordered list. A plurality of dither matrices are then derived, each including M threshold values, each value therein being a threshold value which, when compared to a gray level pixel value enables assignment of a binary value to the pixel. In general, M and P are different integer values. If M is greater than P, the method inserts the P ordered gray level value list into one dither matrix and then inserts into the same one dither matrix at least a further portion of the ordered list, commencing with the first gray level value of the ordered list, until there is no further room for any further insertions in the one dither matrix. Then, the method inserts into a next dither matrix the portion of the ordered list not inserted into the one dither matrix and continues insertion of the ordered list until there is no further room for any further insertions. The method repeats the previous steps until the plurality of dither matrices have been derived. If M is less than P, the method inserts an initial portion of the ordered gray level list into one dither matrix until there is no further room for any further value insertions and then inserts into a next dither matrix a further portion of the ordered list not inserted into the one dither matrix. Thereafter, one or the other sets of dither matrices, as the case may be, is logically tiled over the multi-pixel gray level raster image to enable derivation of the multi-pixel binary level raster image.

4 Claims, 1 Drawing Sheet

IMAGE DITHERING METHOD ENABLING CONVERSION OF A GRAY LEVEL PIXEL IMAGE INTO A BINARY PIXEL IMAGE

FIELD OF THE INVENTION

This invention relates to conversion of a multi-pixel gray level raster image to a multi-pixel binary raster image and, more particularly, to a dither method that enables an arbitrary size dither matrix to be used with an arbitrary number of gray levels present in the gray level raster image.

BACKGROUND OF THE INVENTION

Binary raster printers utilize combinations of on and off dots to create print images. Such binary printers are commonly called upon to reproduce gray scale images, even though many such images contain much more information than is possible to be reproduced in a binary format. To convert a gray level image to a binary image, prior art printers have employed dither matrices. A dither matrix is a two dimensional arrangement of threshold values. The dither matrix shape may be square, rectangular, or any other shape which enables it to be "overlaid" (in a logical graphic sense) onto a multi-pixel gray level image. A gray level image comprises a matrix of pixels (picture elements), each pixel of which is represented by a multi-bit value indicative of a gray level. A dither matrix value which "overlays" a gray level image pixel value enables a computer to determine whether the respective gray level image value is to be converted to an on dot or an off dot in the ultimate binary raster image.

More specifically, each pixel position in a dither matrix is overlaid logically onto a graphical image and is assigned a threshold value which, when compared to the gray level image pixel value (in the underlying image), causes that gray level value to be converted to an on or off dot on the rendered media. Since the dither matrix is generally smaller in size than the entire gray level image, the dither matrix is logically "tiled" or logically replicated across the gray level image until the entire gray level image is "covered" with replicated dither matrices. Conversion or rendering into a binary image proceeds as aforementioned. One skilled in the art will realize that the description of this prior art process is strictly conceptual and that the actual processing of the gray level image and its comparison with the threshold values of the dither matrix is handled in a manner to assure comparison of correspondingly located gray level pixel values with the "overlaid" dither matrix values, but not necessarily in the manner described in the conceptual example given above.

The application of a dither matrix to a gray level image often occurs in printer hardware. Host processors, however, do not necessarily represent images using the same number of gray level values. Thus, printers should preferably be capable of rendering input images which include an indeterminate number of gray levels to represent image pixel values. If the number of gray level pixel values exactly equals the number of pixel positions in a dither matrix, then there is no need to modify the dither matrix to achieve a gray level to binary level image conversion. When such an equality exists, the logical tiling of the dither matrix across the gray level image results in multiple logical repeats of the dither matrix pattern across the image. The resulting binary image will, as a result, often display regularly occurring alias bands or patterns, especially when continuous gray levels are present in the original image. Avoidance of such alias bands and patterns is desirable.

Accordingly, it is an object of this invention to provide an improved method for converting a gray level pixel image to a binary level pixel image, wherein the gray level image may include an indeterminate number of gray level values.

It is another object of this invention to provide an improved method of gray level to binary level pixel image conversion wherein noise bands and strong patterns may be reduced in the resulting binary image.

It is yet another object of this invention to provide an improved method for converting a gray level raster image to a binary level image wherein the size of a dither matrix and the number of gray level values are not equal.

SUMMARY OF THE INVENTION

The method described below converts a multi-pixel gray level raster image to a multi-pixel binary raster image, with the gray level raster image including up to P gray level values. The method first arranges the P gray level values into an ordered list. A plurality of dither matrices are then derived, each including M threshold values, each value therein being a threshold value which, when compared to a gray level pixel value enables assignment of a binary value to the pixel. In general, M and P are different integer values. If M is greater than P, the method inserts the P ordered gray level value list into one dither matrix and then inserts into the same one dither matrix at least a further portion of the ordered list, commencing with the first gray level value of the ordered list, until there is no further room for any further insertions in the one dither matrix. Then, the method inserts into a next dither matrix the portion of the ordered list not inserted into the one dither matrix and continues insertion of the ordered list until there is no further room for any further insertions. The method repeats the previous steps until the plurality of dither matrices have been derived. If M is less than P, the method inserts an initial portion of the ordered gray level list into one dither matrix until there is no further room for any further value insertions and then inserts into a next dither matrix a further portion of the ordered list not inserted into the one dither matrix. Insertion continues of at least a portion of the ordered list until there is no further room for any further insertions and the aforementioned steps are repeated until the plurality of dither matrices have been derived. Thereafter, one or the other sets of dither matrices, as the case may be, is logically tiled over the multi-pixel gray level raster image to enable derivation of the multi-pixel binary level raster image.

DETAILED DESCRIPTION OF THE INVENTION

Figure 1:
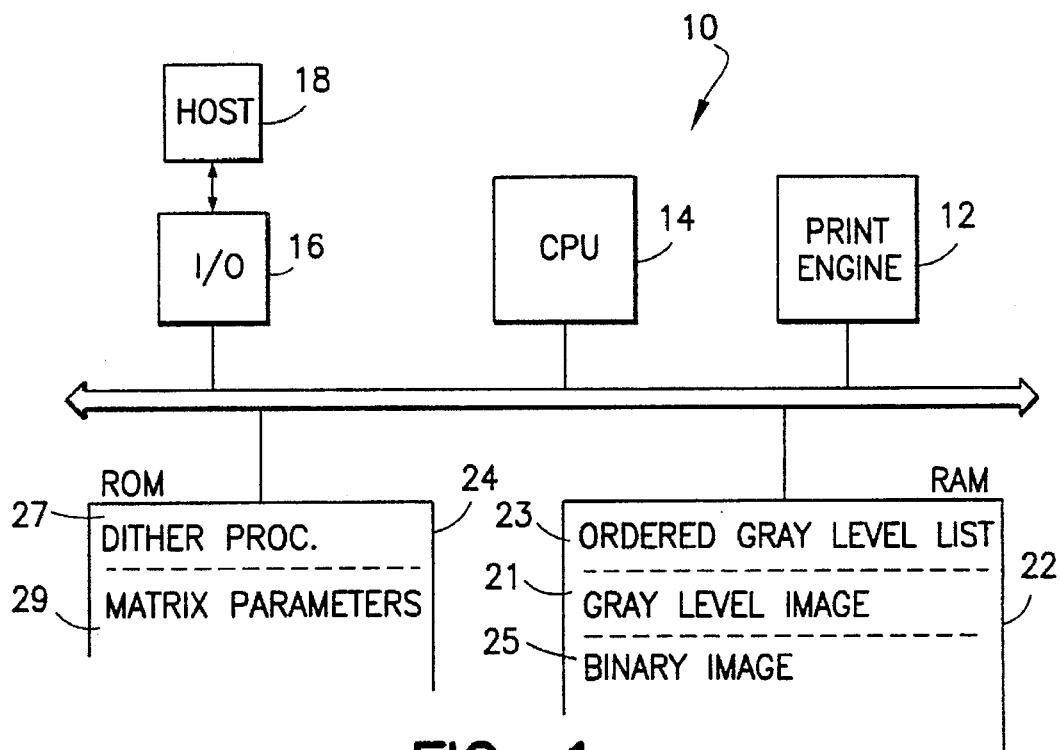
FIG. 1 is a block diagram of a printer that implements the method of the invention.

In FIG. 1, a print apparatus 10 is shown which includes a print engine 12, central processing unit 14 and an input/output module 16. A host processor 18 provides a gray level raster image to print apparatus 10 via I/O module 16. As part of the initialization operation, host processor 18 provides to a print apparatus 10 information defining the total range of gray level values in the gray scale used to represent images.

A received gray level image 21 is stored, for example, in a random access memory (RAM) 22. RAM 22 further includes an ordered list 23 of the gray level values used by host processor 18. The derivation of the ordered list will be considered below. Further, RAM 22, for example, includes a binary image 25 which is created from gray level image 21 received from host processor 18.

A read-only memory (ROM) 24 includes a dither procedure 27 and a matrix dimension definition 29 which, together, enable conversion of a gray level image to a binary level image. The dither matrix to be hereafter considered will be either square or rectangular and have m rows and n columns (where m and n are integers and may or may not be equal). Other shapes of dither matrices are also usable with this invention.

Figure 2:
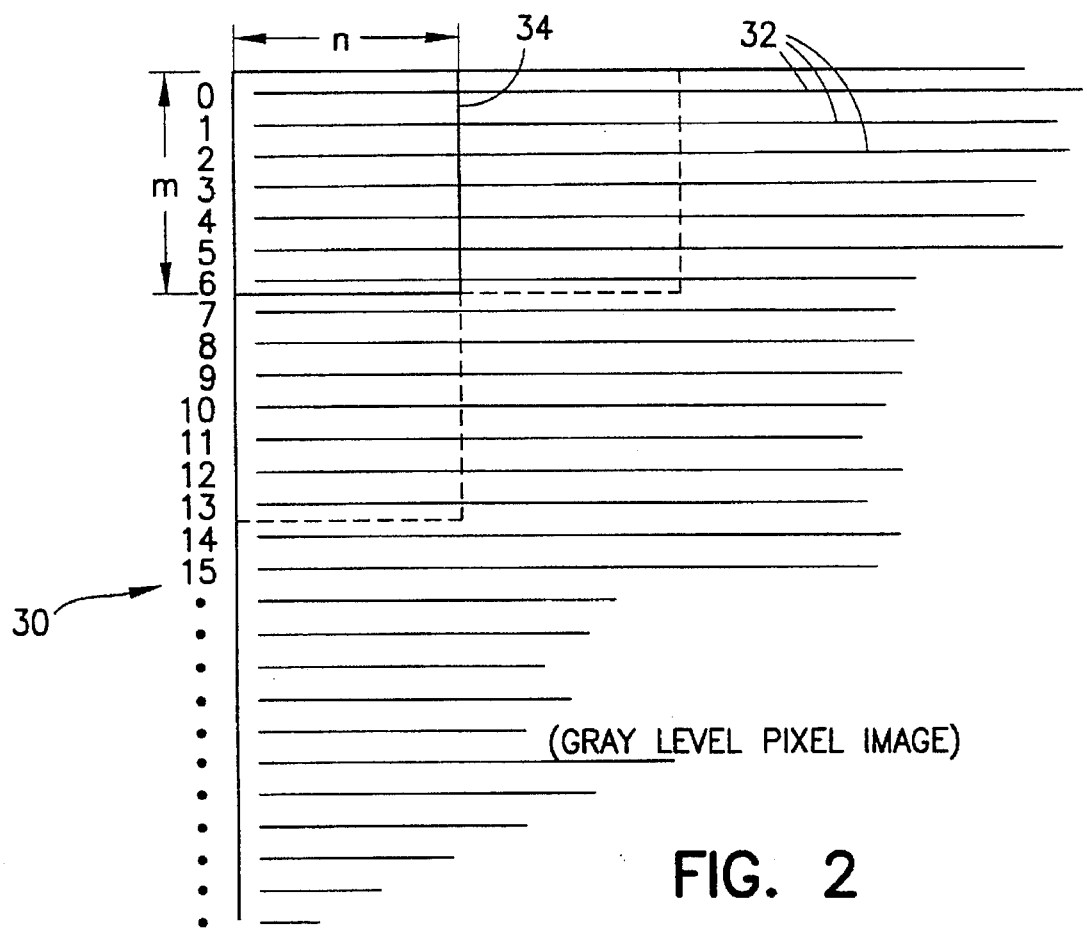
FIG. 2 is schematic view of a gray level image across which a dither matrix has been logically tiled.

As shown in FIG. 2, a raster-arranged gray level pixel image 30 comprises a plurality of raster rows 32. Each raster row is comprised of plural pixels, each pixel evidencing a gray level value which is constrained by the number of bits assigned to represent the value. For example, use of 5 bits to digitize the gray levels enables 32 gray levels to be represented, with 31 levels greater than zero. To convert the gray level pixel values to binary values, a dither matrix 34 is logically "superimposed" over a portion of the gray level image and the "underlying" gray level pixel values are converted to binary values in accordance with the "overlying" dither matrix threshold pixel values.

To achieve a conversion of the entire gray level image, dither matrix 34 is tiled across the image by replicating matrix 34 time after time until the entire image has been covered and the necessary pixel conversions have occurred.

In the prior art, the dither matrix was exactly replicated each time it was logically tiled across the image. In this invention, it is assumed that there is an inequality between the number of gray level values and the size of dither matrix 34. Thus, dither matrix 34 is changed each time it is logically tiled upon the image, by altering its values to assure that all gray level values of the ordered list appear with even frequency, even though they appear in succeeding dither matrices.

The range of gray level values utilized by host processor 18 to represent an image is known to print apparatus 10 as a result of an initialization operation between host processor 18 and print apparatus 10. The dither procedure present in ROM 24 causes the range of gray levels to be permutted into an ordered list L containing P values, the ordering of which assures that a dither matrix into which the ordered list L is configured provides a binary image that closely resembles the received gray level image. The exact ordering of the gray level list is beyond the scope of this invention and many such orderings are known to those skilled in the art.

Hereafter, it will be assumed that the gray level values are ordered in numerically increasing value, starting at level 1. Thus, if 6 bits are employed to represent 36 levels of gray (out of a possible 64), the ordered list L proceeds from 1, 2, 3 ... to 36. The objective of the permutation of the ordering is to distribute over the two-dimensional pixel field of the binary image, each of the gray scale values.

In general, a dither matrix can be said to have M threshold value positions. The method of the invention accesses the ordered list L as a circular list until a count of M (the matrix is "filled") or the beginning of the list is encountered, whichever occurs first. If the end of the list occurs before the count of M occurs, indexing along the list L (from the beginning) continues until a count of M occurs. At this point, an initial dither matrix has been completely filled with threshold gray level values and the filling of a next dither matrix is commenced. That dither matrix starts with the immediate next value in the ordered list and the procedure continues (utilizing the ordered list as a circular list) until the matrix is filled with M gray values from the ordered list, as described above.

The procedure continues the filling of additional matrices until the count of M occurs simultaneously with a last gray level value in the ordered list. At this point, the procedure need only replicate the previously filled set of X dither matrices, as the next set of X dither matrices is identical to the previous set of X dither matrices. Thus, only X dither matrices need to be derived, after which they may be repeated in sets of X.

The repeat factor is when the first value in the ordered list recurs in the first position of a dither matrix. The repeat factor can be determined as follows. Assume that (i) the dither matrix includes M elements (i.e. threshold values) (ii) that there are to be P gray levels (iii) that a=the number of repetitions of the P gray levels and (iv) that b=the number of repetitions of the dither matrix. The repeat occurs when:

$$a*P=b*M \tag{1}$$

To solve equation 1, represent M and P by the product of their respective prime factors $a=x_1*x_2*x_3*x_4 \ldots$ $b=y_1*y_2*y_3*y_4 \ldots$ From equation 1, $$a/b=x_1*x_2*x_3*x_4\ldots/y_1*y_2*y_3*y_4\ldots \tag{2}$$

Eliminate the common prime factors by division of the numerator and denominator by each common prime factor. Assume that the following relationship results where all of the x's and y's are different, prime and integers:

$$a/b=x_2*x_3/y_1*y_4 \tag{3}$$

Hence the repeat occurs when:

$$x_2*x_3(P)=y_1*y_4(M) \tag{4}$$

The following is an actual numerical example wherein M=64 and P=36. Thus $$a/b=M/P=64/36=2^6/3^2*2^2=16/9$$

a=16; b=9

Thus, for an 8×8=64 sized M dither matrix containing 64 threshold values, there will be 9 repetitions of M (or 9 different dither matrices) and 16 repetitions of list L (containing 36 gray scale values) to arrive at $$9*64=16*36=576$$

total pixels logically covered before dither matrix M values start to repeat. Because the threshold values present in the dither matrices within a repeat are not the same on a matrix-to-matrix basis, the frequency of any visual patterning or noise in the ultimate binary gray scale image is reduced. Further, the procedure assures an equal frequency of occurrence of all of the threshold values for integral repeats. The following is a further example to enable a more detailed understanding of the invention. Assume that the length of the ordered list L is 36, i.e., there are P=36 levels of gray, not including zero. Assume further that the method maps an 8×8, m==8, dither matrix M to P==36 levels of gray. In this case the number of countable positions in matrix M is represented by the symbol ms. M is loaded from the elements of the permutation array P (i.e. the ordered list).

The P array can have an arbitrary length, and is treated as a circular list for purposes of indexing, that is, k is always constrained to the limits of the size of P after k has been incremented or decremented. P contains threshold levels for comparison to gray level image pixels to be rendered into a binary image.

PERMUTATION ARRAY P: There are (L−1)! or 36 factorial possible permutations of P, however for this example a simple linear progression is used as the permutation. P represents gray threshold comparison levels to load into the dither matrix M. Of course, the ordering of P may be algorithmically derived, and in that case P is unnecessary.

| contents of P |
|---|
| 01 02 03 04 05 06 07 08 09 10 11 12 13 14 15 16 . . . 31 32 33 34 35 36 |

0  1  2  3  4  5  6  7  8  9 10 11 12 13 14 15 . . . 30 31 32 33 34

(L−2) = 35 kth indices to P k=1st location to start (could be anywhere in the range 0 . . . (L−2), and wraps around when it reaches the end by incrementing or decrementing)
the prime factors of 36 are: 2 2 3 3
the prime factors of 64 are: 2 2 2 2 2 2
From the previous numerical example given above, this means that b=3*3=9 iterations of the dither matrix are required before a matrix a repeat occurs, (i.e. a=2*2*2*2 or 16 repetitions of each threshold value results).

Below is a permutted list of the positions of M, assuming M to be "unwrapped" in a simple left-to-right, top-to-bottom fashion. S is used to select how the contents of P are loaded into matrix M. Of course, the ordering of S may be algorithmically derived, and in that case S is unnecessary. The contents of S below have been chosen to be one of the simplest permutation of the numbers 1 . . . (m*m), where m=8.

| contents of S |
|---|
| 01 02 03 04 05 06 07 08 09 10 11 12 13 14 15 16 . . . 59 60 61 62 63 64 |

0  1  2  3  4  5  6  7  8  9 10 11 12 13 14 15 . . . 58 59 60 61 62

(m*m−1)

ith indices to S i=1st location to start (could be anywhere in the range 0 . . . (m*m−1), and wraps around when it reaches the end by incrementing or decrementing)

Load the entire (m×m) dither matrix M every m complete image raster lines of processed pixels, starting from the kth pointer into the circular permutation array P and incrementing or decrementing k modulo the permutation array size (L−1) for each copy of the P[k] value loaded into the dither matrix M. The value at P[k] goes into location M[S][i]. Indices i and k are simultaneously incremented or possibly decremented modulo the size of arrays S and P respectively, ms=m*m or (L−1). The ordering S for loading dither matrix M is arbitrary, and can repeated if desired for each complete repeat cycle. This also means that S may be held constant, but it is not necessary to do so.

EXAMPLE WRITTEN IN THE C LANGUAGE:

Each time a value is copied from P into M, the CPU source code performs the following operations, assuming the indices i and k are incremented for each load. This code is only an example, and actual implementations may vary. Indices i and k need to be pre-initialized into the ranges 0 . . . ms and 0 . . . (L−1) respectively.

$$M[S [(i\text{++})\%ms]=P\{k\text{++}\}\%(L-1)]$$

where: ms is the size of matrix M (the countable number of elements in matrix M, m*m), and (L−1) is the countable number of elements in array P.

If the square, m==8, dither matrix M is loaded in a left to right raster fashion as shown in array S above, from gray levels stored in array P of size (L−1) above, the following dither matrices result:

| | |
|---|---|
| 01 02 03 04 05 06 07 08 | 1st lines of raster (0..7) |
| 09 10 11 12 13 14 15 16 | use this dither matrix |
| 17 18 19 20 21 22 23 24 | |
| 25 26 27 28 29 30 31 32 | |
| 33 34 35 36 01 02 03 04 | |
| 05 06 07 08 09 10 11 12 | |
| 13 14 15 16 17 18 19 20 | |
| 21 22 23 24 25 26 27 28 | |
| 29 30 31 32 33 34 35 36 | 2nd 8 lines of raster (8..15) |
| 01 02 03 04 05 06 07 08 | use this dither matrix |
| 09 10 11 12 13 14 15 16 | |
| 17 18 19 20 21 22 23 24 | |
| 25 26 27 28 29 30 31 32 | |
| 33 34 35 36 01 02 03 04 | |
| 05 06 07 08 09 10 11 12 | |
| 13 14 15 16 17 18 19 20 | |
| 21 22 23 24 25 26 27 28 | 3rd 8 lines of raster (16..23) |
| 29 30 31 32 33 34 35 36 | use this dither matrix |
| 01 02 03 04 05 06 07 08 | |
| 09 10 11 12 13 14 15 16 | |
| 17 18 19 20 21 22 23 24 | |
| 25 06 07 08 09 10 11 12 | |
| 33 34 35 36 01 02 03 04 | |
| 05 06 07 08 09 10 11 12 | |
| 13 14 15 16 17 18 19 20 | 4th 8 lines of raster (24..31) |
| 21 22 23 24 25 26 27 28 | use this dither matrix |
| 29 30 31 32 33 34 35 36 | |
| 01 02 03 04 05 06 07 08 | |
| 09 10 11 12 13 14 15 16 | |
| 17 18 19 20 21 22 23 24 | |
| 25 26 27 28 29 30 31 32 | |
| 33 34 35 36 01 02 03 04 | |
| 05 06 07 08 09 10 11 12 | 5th 8 lines of raster (32..39) |
| 13 14 15 16 17 18 19 20 | use this dither matrix |
| 21 22 23 24 25 26 27 28 | |
| 29 30 31 32 33 34 35 36 | |
| 01 02 03 04 05 06 07 08 | |
| 09 10 11 12 13 14 15 16 | |
| 17 18 19 20 21 30 31 32 | |
| 33 34 35 36 01 02 03 04 | 6th 8 lines of raster (40..47) |
| 05 06 07 08 09 10 11 12 | use this dither matrix |
| 13 14 15 16 17 18 19 20 | |
| 21 22 23 24 25 26 27 28 | |
| 29 30 31 32 33 34 35 36 | |
| 01 02 03 04 05 06 07 08 | |
| 09 10 11 12 13 14 15 16 | |
| 17 18 19 20 21 22 23 24 | |
| 25 26 27 28 29 30 31 32 | 7th 8 lines of raster (48..55) |
| 33 34 35 36 01 02 03 04 | use this dither matrix |
| 05 06 07 08 09 10 11 12 | |
| 13 14 15 16 17 18 19 20 | |
| 21 22 23 24 25 26 27 28 | |
| 29 30 31 32 33 34 35 36 | |
| 01 02 03 04 05 06 07 08 | |
| 09 10 11 12 13 14 15 16 | |

```
17 18 19 20 21 22 23 24    8th 8 lines of raster (56..63)
25 26 27 28 29 30 31 32    use this dither matrix
33 34 35 36 01 02 03 04
05 06 07 08 09 10 11 12
13 14 15 16 17 18 19 20
21 22 23 24 25 26 27 28
29 30 31 32 33 34 35 36
01 02 03 04 05 06 07 08

09 10 11 12 13 14 15 16    9th 8 lines of raster (64..71)
17 18 19 20 21 22 23 24
25 26 27 28 29 30 31 32
33 34 35 36 01 02 03 04
05 06 07 08 09 10 11 12
13 14 15 16 17 18 19 20
21 22 23 24 25 26 27 28
29 30 31 32 33 34 35 36
```

The above dither matrix sequence repeats again here. There are equal counts of each gray level threshold in each set of 9 matrices. At this point one can re-permute array P or S without any penalty regarding the frequency of the dither levels. That is, the count of some arbitrary level, say level 10, is (9*8*8/36)=16 at this point, as is the count of all the other levels in P.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for converting a multi-pixel gray level raster image to a multi-pixel binary level raster image, said gray level raster image including up to P gray level values, said method comprising the computer implemented steps of:

a. arranging said P gray level values in an ordered list having first and last values;

b. deriving a plurality of dither matrices, each including M pixel values and manifesting m rows by n columns, each pixel value being a threshold value which, when compared to a gray level pixel value, enables said computer to assign a binary value to said pixel, and wherein M and P are different integer values, and i. if M>P, (a) inserting said ordered list into one dither matrix and, at the end of insertion of said ordered list, inserting into said one dither matrix at least a portion of said ordered list, commencing with the first value of said ordered list, until there is no further room for any further insertions in said one dither matrix, and (b) inserting into a next dither matrix a portion of said ordered list not inserted into said one dither matrix and continuing insertion of said ordered list therein until there is no further room for any further insertions, and repeating steps i(a) and i(b) until said plurality of dither matrices have been derived; or ii. if M<P, (a) inserting an initial portion of said ordered list into one dither matrix until there is no further room for any further insertion in said one dither matrix, and (b) inserting into a next dither matrix a further portion of said ordered list not inserted into said one dither matrix and continuing insertion of at least a portion of said ordered list therein until there is no further room for any further insertion, and repeating steps ii(a) and ii(b) until said plurality of dither matrices have been derived; and c. logically tiling dither matrices derived in i or ii, as the case may be, over said multi-pixel gray level raster image to enable said computer to derive said multi-pixel binary level raster image.

2. The method as recited in claim 1, wherein said plurality of dither matrices is derived from equation 1 below as follows:

$$a*P = b*M \tag{1}$$

where:

a = the number of repetitions of the P gray levels, and b = the number of repetitions of the dither matrix and M and P are represented by products of their respective prime factors $$a = x_1 * x_2 * x_3 * x_4 \ldots$$

$$b = y_1 * y_2 * y_3 * y_4 \ldots$$

and equation 1 results in $$a/b = x_1 * x_2 * x_3 * x_4 \ldots \tag{2}$$

and common prime factors are removed by division from equation 2 to result in a minimum repeat value of b*M.

3. The method as recited in claim 1, wherein said plurality of dither matrices comprise a set which repeats after a dither matrix which ends with a last value of said ordered list.

4. The method as recited in claim 3, further comprising the step of:

rearranging said P gray level values in a different ordered list having first and last values and repeating steps b and c.

* * * * *